Figure 1:
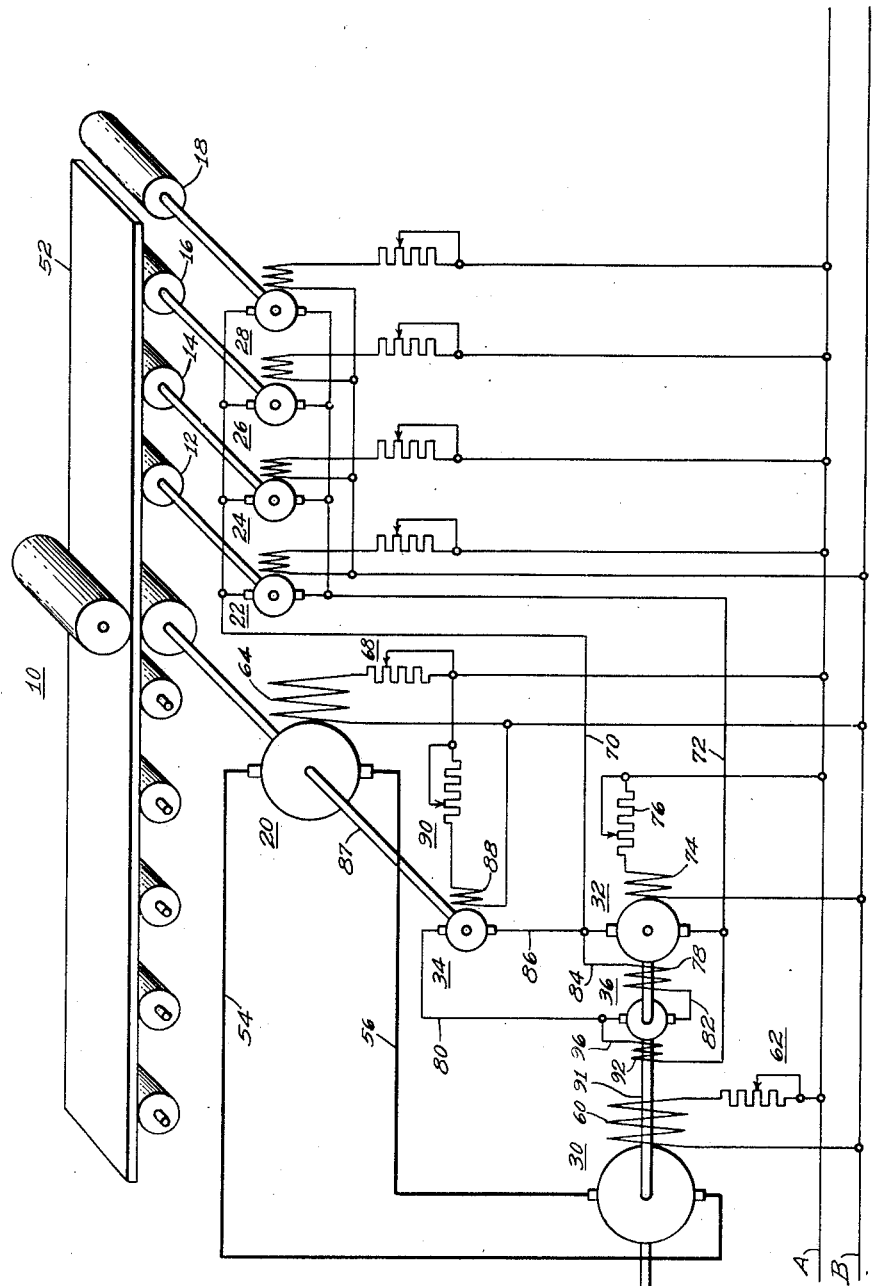

June 1, 1943.    W. G. COOK    2,320,850
CONTROL SYSTEM

Original Filed April 25, 1939    2 Sheets-Sheet 2

Fig. 2.

Fig. 3.

WITNESSES:
C. J. Weller.
Wm. C. Groome

INVENTOR
Willard G Cook.
BY
G. M. Crawford
ATTORNEY

Patented June 1, 1943

2,320,850

UNITED STATES PATENT OFFICE 2,320,850

CONTROL SYSTEM

Willard G. Cook, Wilkinsburg, Pa., assignor to Westinghouse Electric & Manufacturing Company, East Pittsburgh, Pa., a corporation of Pennsylvania Original application April 25, 1939, Serial No. 269,907. Divided and this application January 9, 1941, Serial No. 373,855

6 Claims. (Cl. 172—239)

My invention relates, generally, to control systems and, more particularly, to control systems for maintaining a desired relation between the output potentials of a plurality of generators.

This application is a division of my copending application Serial No. 269,907, filed April 25, 1939, entitled Control systems and assigned to the Westinghouse Electric & Manufacturing Company.

In the operation of two or more associated work devices between whose speeds it is desired to maintain a desired relationship, it is common practice to drive one of the devices by a motor whose armature is energized by a continuously-driven generator, the output potential of which is varied by varying its excitation in accordance with the speed of the other device. Thus as the speed of the second mentioned of these devices is varied, the armature energization of the first mentioned device is varied to vary the speed of the first device accordingly.

This method of maintaining the desired speed relationship between work devices has been applied to rolling mills where the reel motor or run-out table motors are energized by a continuously driven main generator, the excitation of the main generator being provided by a continuously excited pilot generator driven by the mill roll motor and thus exciting the main generator in accordance with the speed of the mill motor. It will be understood that the output potential of the main generator will be proportional to the output potential of the pilot generator and the speeds of the reel motor or table roll motors and the mill motor will have the same relationship.

This system has the disadvantage however that during periods of acceleration and deceleration of the mill the potential of the main generator does not maintain the proportional relationship with the potential of the pilot generator due to the fact that the main generator, being a relatively large machine, has a field winding of relatively high inductance and this causes a considerable time lag between a given change in the potential of the pilot generator and the potential of the main generator which is controlled by the potential of the pilot generator. Thus the desired speed relationship of the mill roll, reel, and table roll motors will not be maintained during acceleration and deceleration periods of a rolling mill controlled by this system.

It is the object of the invention, therefore, to provide a control system for a plurality of work devices which shall function to maintain a desired speed relation between the work devices regardless of the acceleration and deceleration of the devices.

Another object of the invention is to provide a control system for a plurality of generators which shall function to maintain a predetermined selectable proportional relationship between the output potentials of the generators.

A further object of the invention is to provide a control system for a plurality of motors which shall function to maintain a predetermined selectable speed relation between the motors.

These and other objects and advantages of the invention will be apparent from the following detailed description taken in connection with the accompanying drawings, in which like reference characters are used to designate identical and similar elements of structure and in which, Figure 1 is a diagrammatic view of a control system for a portion of a rolling mill embodying the principal features of my invention, and Figs. 2 and 3 are diagrammatic views of other embodiments of my invention.

In the embodiment of my invention shown in Fig. 1, the reducing rolls 10 and the run-out table rolls 12, 14, 16, and 18 of a rolling mill are provided with drive motors 20, 22, 24, 26 and 28, respectively. The roll motor 20 is connected to be energized by a generator 30 whose output potential may be varied to control the speed of the motor 20.

The table roll motors 22, 24, 26 and 28 are connected to be energized by a generator 32 whose excitation is varied in accordance with the speed of the roll motor 20 by connecting one of its field windings to be energized by a pilot generator 34 driven by the motor 20. Field forcing of the generator 32 is provided by a pilot generator 36, which is connected to vary the excitation of the generator 32 in accordance with the difference between the output potentials of the generators 32 and 34.

In the embodiment of the invention of Fig. 2, the booster generator 36 is excited in accordance with the difference between the potential of the pilot generator 34 and that of a pilot generator 34' driven by the table roll motor 22.

The embodiment of the invention shown in Fig. 3 provides for simultaneous adjustment of the field energization of the main generator 30 and the generator 32 which energizes the reel motor or the table roll motors, by means of a rheostat 51. The pilot generator 36 is excited in accordance with the difference in the output potentials of the generators 30 and 32.

It is to be understood that the systems shown in Figs. 2 and 3 may be substituted for the corresponding elements in the system of Fig. 1, that the systems of all of the figures may be used to control analogous parts of other similar work devices, and that any operative subcombination of any of the embodiments of the invention may be used in other systems where its function as herein described may be utilized.

Referring again to Fig. 1 of the drawings, the rolls 10 of the mill are driven by the motor 20 to act upon the slab 52, passing it through the mill in the direction shown by the arrow. The motor 20 is energized by the generator 30 through the conductors 54 and 56. The generator 30 is continuously driven by synchronous motor 58 or any other suitable driving means. The field winding 60 of the generator 30 is connected through a rheostat 62 to any suitable source of direct current power indicated by the conductors A—B. The rheostat 62 may be adjusted to vary the excitation and, therefore, the output potential of the generator 30. This variation of the armature potential of the motor 20 will vary the speed of the motor 20.

The field winding 64 of the motor 20 is connected through a rheostat 68 to the conductors A—B. The base speed or normal speed range of the motor 20 may be varied by varying its excitation by the adjustment of the rheostat 68.

The table roll motors 22, 24, 26 and 28 have their armatures connected in parallel circuit relation to be energized by the generator 32 through the conductors 70 and 72. The excitation of the generator 32 may be varied by adjusting the current flow in its field winding 74 by means of a rheostat 76. The generator 32 is provided with another field winding 78 which is connected to be energized by the output potentials of the pilot generator 34 and the booster generator 36. The circuit for the field winding 78 extends from one side of the pilot generator 34 through the conductor 80, the booster generator 36, the conductor 82, the field winding 78, and the conductors 84 and 86 to the other side of the pilot generator 34.

The pilot generator 34 is provided with a field winding 88 which is connected in series circuit relation with a rheostat 90 to the conductors A—B. The generators 32 and 36 may be continuously driven by the motor 58 through an extension of its shaft 81. The booster generator 36 is provided with a field winding 92 which is energized in accordance with the difference in the output potentials of the generators 32 and 34, the field winding 92 being connected by conductor 94 to one side of the generator 32 and by conductors 96 and 80 to one side of the pilot generator 34 and the other side of the generators 32 and 34 being connected together by the conductor 86.

In the operation of the system of Fig. 1, the excitations of the motors 20, 22, 24, 26 and 28 may be so adjusted as to provide the desired speed ranges of these motors. The output potential of the pilot generator 34 will be adjusted by means of rheostat 90, and the output potential of the generator 32 will be adjusted by the rheostat 76 to provide the desired relation between these potentials to establish such a speed relation between the motors 20, 22, 24, 26 and 28 as will result in equal peripheral speeds of the rolls 10 and the table rolls 12, 14, 16 and 18. It will be seen that the output potential of the pilot generator 34 will vary directly with the speed of the motor 20 since the pilot generator 34 is driven by the extension of the shaft 87 of the motor 20.

As the speed of the motor 20 is varied by varying the excitation of the generator 30, the pilot generator 34 will vary the potential applied to the field winding 78 of the generator 32 to thus vary the output potential of the generator 32 and vary the speeds of the motors 22, 24, 26 and 28 accordingly.

However, the size of the generator 32 is such that its field winding 78 has a considerable inductance, and there will be a time lag between the change of the potential applied to the field winding 78 due to the change of the output potential of the pilot generator 34 and the corresponding change in the excitation of the generator 32 to produce a corresponding change in the output potential of the generator 32.

During the interval of this time lag the output potential of the pilot generator 34 will increase faster than the output potential of the generator 32, and there will thus be a corresponding change in the difference in these potentials. Since the booster generator 36 is connected to be excited in accordance with the difference of the potentials of the generators 32 and 34, the output potential of the booster generator 36 will be increased, thus causing an increase in the potential applied to the field winding 78 to "force" the field winding 78 by applying to it a higher potential than that necessary to provide the current flow in the field winding 78 corresponding to the desired new output potential of the generator 32. Thus, the booster generator 36 will function to compensate for the time lag due to the inductance of the field winding 78 by applying an extra potential to this field winding proportional to this time lag, and this will result in a more nearly simultaneous increase of the output potentials of the pilot generator 34 and the generator 32 and accordingly, the simultaneous proportional changes in the speeds of the motor 20 and the motors 22, 24, 26 and 28.

In the embodiment of the invention shown in Fig. 2, the pilot generator 34' is driven by the table roll motor 22 and has its field winding 88' connected for continuous energization through a rheostat 90' to the conductors A—B, as indicated. The armature of the pilot generator 34' is connected with its polarity opposing that of the pilot generator 34 in a series circuit extending from one side of the armature 34' through a conductor 158, the armature of the pilot generator 34, conductor 80, the field winding 92 of the booster generator 36, conductor 160, a rheostat 162 and conductor 164 to the other side of the pilot generator 34'. With this circuit it will be seen that the field winding 92 of the booster generator 36 will be energized in accordance with the difference between the output potentials of the pilot generators 34 and 34' and the output potential of the booster generator 36 will also vary in accordance with this difference. Since the output potentials of the pilot generators 34 and 34' are proportional to the speeds of the motors 20 and 22, any variation from the desired relative speeds of the motors 20 and 22 will be compensated for by a corresponding variation of the excitation of the generator 32, thus adjusting the speed of the motor 22 by adjustment of its armature potential.

In the embodiment of the invention of Fig. 3, simultaneous variation of the speeds of the motors 20 and 22 is provided by the actuation of the rheostat 51 to vary the energization of the generators 30 and 32 which energize the armatures of the motors 20 and 22, respectively. The rheostat 51 comprises a variable resistor 166 connected in the energizing circuit of the field winding 60 of the generator 30 and a variable resistor 168 connected in the energizing circuit of the field winding 78 of the generator 32. The variable resistors 166 and 168 are mechanically connected to be simultaneously actuated by an operating handle 170.

The booster generator 36 is also connected in circuit with the field winding 78 of the generator 32 and has field windings 172 and 174. The field winding 172 is connected to be energized by the output potential of the generator 32 in series with an adjusting rheostat 176. Similarly, the field winding 174 is connected to be energized by the output potential of the generator 30 in series circuit with an adjusting rheostat 178. The field windings 172 and 174 are connected to oppose each other, so that the net excitation of the booster generator 36 will vary in accordance with the difference in the output potentials of the generators 30 and 32.

In the operation of this embodiment of the invention, when it is desired to change the speed of the motors 20 and 22, the rheostat 51 is operated, as hereinbefore described, to vary the energization of the field windings of the generators 30 and 32 and to thus vary their output potentials. If, however, due to the inductances of the field windings 60 and 78, the output potentials of the generators 30 and 32 do not vary corresponding amounts, the variation of the difference of these potentials will cause a variation in the excitation of the booster generator 36 which, in turn, will vary the energization of the field winding 78 of the generator 32 to thus "force" the field of this generator to compensate for the variation in the difference in the potentials of the generators 30 and 32.

It will be seen that I have provided a control system for a plurality of work devices which shall function to maintain a desired speed relation between the work devices regardless of the acceleration and deceleration of the devices, which may be adjusted as desired to vary such speed relations, and which shall be simple in operation and inexpensive to manufacture, install and maintain.

In compliance with the requirements of the patent statutes, I have shown and described herein the preferred embodiments of my invention. It is to be understood, however, that the invention is not limited to the precise constructions shown and described but is capable of modification by one skilled in the art, the embodiments herein shown being merely illustrative of the principles of my invention.

I claim as my invention:

1. In a control system for maintaining predetermined speed relations between a pair of motors, a separate variable potential generator energizing each of the motors, a booster generator connected to vary the excitation of one of said generators, and means applying a net excitation to said booster generator proportional to the differences between quantities which are functions of the speeds of the motors.

2. In a control system for a pair of motors, a main generator connected to energize one of the motors, a first pilot generator driven by the other motor for exciting said main generator, a booster generator also connected to excite said main generator, a second pilot generator driven by said one motor, and means for exciting said booster generator in accordance with the difference between the output potentials of said first and second pilot generators.

3. In a control system for a pair of motors, a main generator connected to energize one of the motors, a first pilot generator driven by the other motor, a booster generator, means connecting said booster generator, said first pilot generator and the field winding of said other motor in series circuit relation, a second pilot generator driven by said one motor, and means connecting said first and second pilot generators and the field winding of said booster generator in series circuit relation.

4. In a control system for a pair of motors having individual main generators connected to energize their respective armatures, a booster generator connected in series circuit relation with the field winding of one of the main generators, and means connecting the main generators to excite said booster generator in accordance with the output potentials of the generators, and means for simultaneously varying the excitation of the main generators.

5. In a control system for a pair of motors, a main generator connected to energize each of the motors, means for simultaneously varying the excitation of said main generators, a booster generator connected to affect the excitation of one of the main generators, and means exciting said booster generator in accordance with the difference between the output potentials of said main generators.

6. In a control system for a pair of motors having individual main generators connected to energize their respective armatures, a booster generator connected in series circuit relation with the field winding of one of the main generators, a pair of field windings for said booster generator connected in opposed relation, means connecting each of said booster field windings to be energized by the output potential of a separate one of said main generators, and means for simultaneously varying the excitation of the main generators.

WILLARD G. COOK.